No. 697,330. Patented Apr. 8, 1902.
W. DE FREITAS.
TUBE CLAMP.
(Application filed Nov. 7, 1901.)
(No Model.)
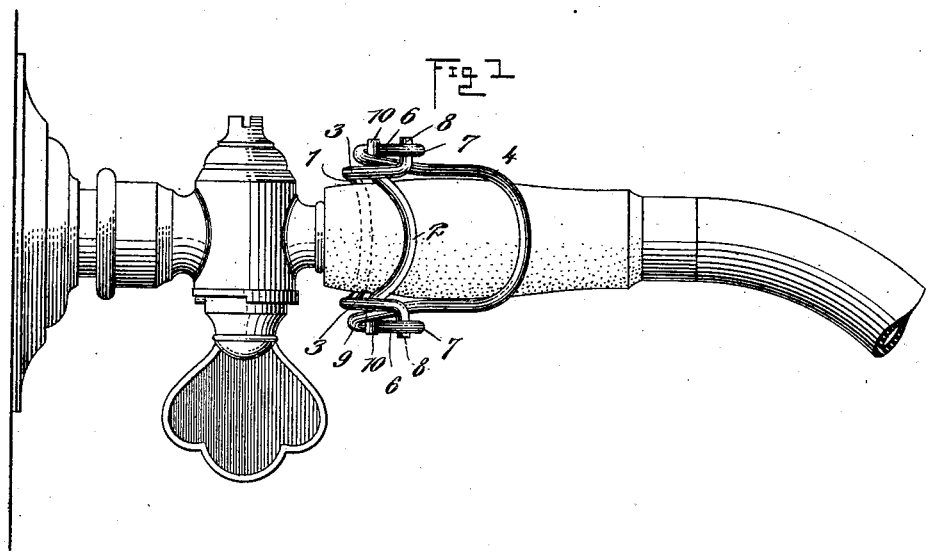
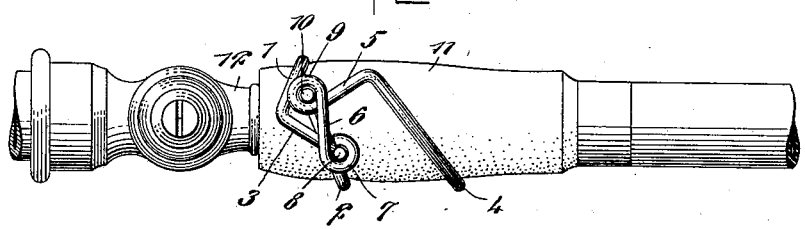
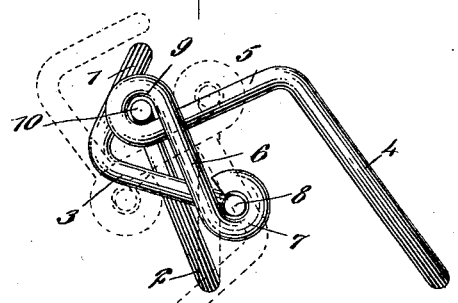
WITNESSES:
INVENTOR
William De Freitas
BY
ATTORNEYS

UNITED STATES PATENT OFFICE.

WILLIAM DE FREITAS, OF NEW YORK, N. Y.

TUBE-CLAMP.

SPECIFICATION forming part of Letters Patent No. 697,330, dated April 8, 1902.

Application filed November 7, 1901. Serial No. 81,386. (No model.)

*To all whom it may concern:*

Be it known that I, WILLIAM DE FREITAS, a citizen of the United States, and a resident of the city of New York, borough of Manhattan, in the county and State of New York, have invented a new and Improved Tube-Clamp, of which the following is a full, clear, and exact description.

This invention relates to improvements in clamping devices for securing a flexible tube to a metal tube, particularly a rubber tube to a gas cock or nipple; and the object is to provide a clamp of simple and inexpensive construction that may be quickly applied to make a gas-tight joint between the two tubes and to prevent accidental detachment of one tube from the other.

I will describe a tube-clamp embodying my invention and then point out the novel features in the appended claims.

Reference is to be had to the accompanying drawings, forming a part of this specification, in which similar characters of reference indicate corresponding parts in all the figures.

Figure 1 is a plan view of a tube-clamp embodying my invention, showing the same as applied. Fig. 2 is a side view thereof, and Fig. 3 is a side view showing the clamp in its different positions.

The device comprises members 1 2, adapted to engage opposite sides of a tube. These clamping members in their body portions are made substantially U-shaped, and extended from the ends of the member 1 and at substantially right angles thereto are arms 3. The lever member consists of a substantially U-shaped body portion 4, from the ends of which portions 5 extend at substantially right angles to the body, and from the ends of these portions 5 arms 6 project at an angle to the extensions 5 or substantially parallel with the side members of the body 4. These arms 6 terminate in eyes 7, which form bearings for lugs 8, extended outward from the arms 3, and at the junction of the extensions 5 and the arms 6 eyes 9 are formed to provide bearings for the outwardly-extended lugs 10 on the ends of the clamp member 2. These several parts are preferably made of wire, the lever, with its connections, being formed of a single length of wire.

In using the clamp it may be first opened, as indicated by the dotted lines in Fig. 3, to permit the end of the flexible tube 11 to pass between the clamp members, and then after placing the flexible tube over the metal tube or nipple 12 the lever is to be moved to the position shown in full lines in Fig. 3 and, as indicated in Figs. 1 and 2, to engage against the rubber tube. By this movement the clamping members will be drawn tightly against the tube, and their pivotal points or their pivotal connections with the clamp will be one forward of the other, as clearly indicated in Fig. 2, so that the lever 4 cannot be accidentally swung to its open position.

Having thus described my invention, I claim as new and desire to secure by Letters Patent—

1. A tube-clamp comprising two clamping members for engaging opposite sides of a tube and a lever member having extensions at an angle to the body, and arms projected from the extensions substantially parallel with the body, one of the clamping members having bearings at the ends of the arms and the other clamping member having bearings at the ends of the extensions, substantially as specified.

2. A tube-clamp, comprising two clamping members for engaging opposite sides of a tube, and a lever member consisting of a substantially U-shaped top portion having end extensions at an angle to the body and arms at the ends of the extensions projected substantially parallel with the body, one of the clamping members having bearings at the end of the arms, and the other clamping member having bearings at the end of said extensions, substantially as specified.

3. A tube-clamp, comprising two clamping members for engaging opposite sides of a tube, one of said clamping members having portions extended at substantially right angles to its body and terminating in outwardly-extended lugs, the other of said members having at its ends outwardly-extended lugs, and a lever member having a U-shaped body portion, portions extended at substantially right angles to the body portion, and arms projecting from said extensions forming eyes to receive the lugs last mentioned, and the said arms having eyes at the ends to receive the lugs first mentioned, substantially as specified.

In testimony whereof I have signed my name to this specification in the presence of two subscribing witnesses.

WILLIAM DE FREITAS.

Witnesses:
C. R. FERGUSON,
EVERARD B. MARSHALL.